May 15, 1923.  1,455,371
J. F. WHITE
HOOD LATCH
Filed Jan. 3, 1921    2 Sheets-Sheet 1
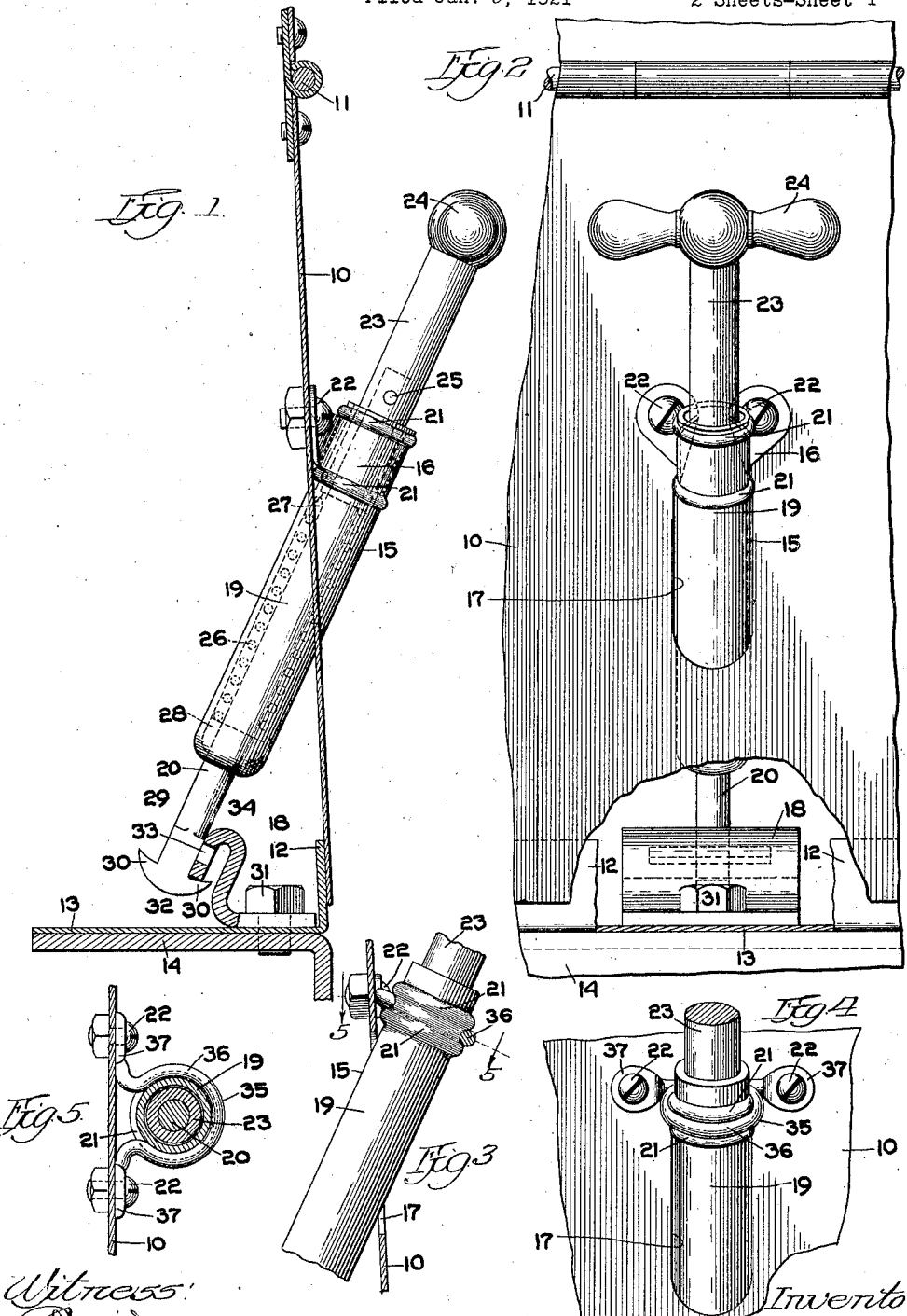
Inventor
John F. White
By Cromwell, Greist & Warden
Attys.

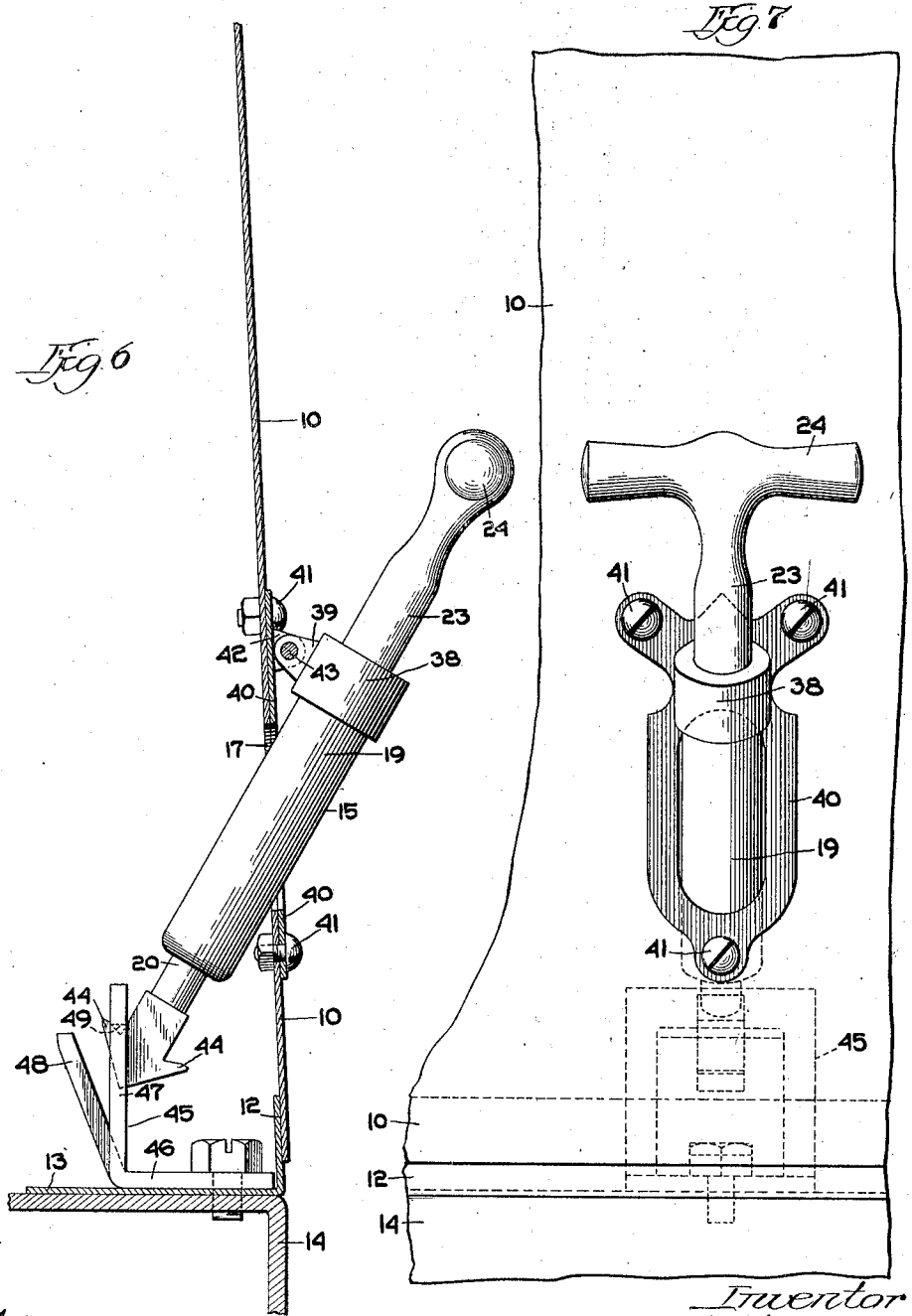

Patented May 15, 1923.

1,455,371

UNITED STATES PATENT OFFICE.

JOHN F. WHITE, OF CHICAGO, ILLINOIS, ASSIGNOR TO WHITE PRODUCTS CO., OF CHICAGO, ILLINOIS, A CORPORATION OF ILLINOIS.

HOOD LATCH.

Application filed January 3, 1921. Serial No. 434,859.

*To all whom it may concern:*

Be it known that I, JOHN F. WHITE, a citizen of the United States, residing at Chicago, in the county of Cook and State of Illinois, have invented certain new and useful Improvements in Hood Latches, of which the following is a specification.

This invention relates to latches, and is concerned in particular with an extremely simple and efficient automobile hood latch of pleasing appearance. Although the latch of the present invention is intended primarily for use with motor vehicles as a hood fastening means, it is obvious that the same may be advantageously employed as a fastening means in many diversified connections.

Certain of the principal objects of the invention are the provision of a hood latch which is easily unfastened by merely turning the handle thereof a quarter of a turn in either direction; which is fastened, upon the lowering of the hood in a natural manner, without the necessity of a subsequent quarter turn; which, when fastened, exerts a continuous and adjustable resultant pull upon the hood whereby the side thereof is drawn downwardly and inwardly against the frame of the vehicle; and which is characterized by simplicity of construction and consequent economy in manufacture.

Numerous other objects and advantages of this invention will become apparent as the nature of the same is understood from the accompanying drawings and following detailed description based thereon.

Inasmuch as the invention is also capable of embodiment in forms which may differ in unessential details from the embodiments hereinafter used for the purpose of exemplification, it should be understood that the description and drawings are not intended to limit unnecessarily the spirit of the invention or the scope of the appended claims.

In the drawings—

Fig. 1 is a sectional view through a portion of a vehicle hood and frame, showing, in side elevation, the latching device of this invention;

Fig. 2 is a front elevation of the latching device together with adjacent portions of the vehicle structure, the hood of which is partially broken away to show the keeper bracket;

Figs. 3 and 4 are fragmentary side and front elevations, respectively of a modified form of connection between the hood and latch, Fig. 3 being a view partially in section;

Fig. 5 is a sectional view on the line 5—5 of Fig. 3; and

Figs. 6 and 7 are side and front elevations respectively, of a modified form of the hood latch and the adjacent vehicle structure, the hood and frame thereof being shown in section in Fig. 6, and in front elevation in Fig. 7.

Referring to the drawings, and particularly to that embodiment of the invention illustrated in Figs. 1 and 2 thereof, the numeral 10 designates generally the side of a vehicle hood, which is pivoted to the upper portion of the hood at 11 and contacts, along its lower inner edge, with the parallel, upwardly-bent flange 12 of a frame member 13 forming a portion of the frame structure 14.

The latching device of this invention, which is indicated generally by the numeral 15, is shown as attached to the outer side of the hood by means of an annular band-like yoke 16, and, immediately below the yoke 16 passes into the interior of the hood through an aperture 17 in the side thereof. The lower extremity of this latching device cooperates, within the hood, with a stationary latch keeper 18 mounted upon the previously mentioned frame member 15.

The numeral 19 designates a tubular, open-ended sleeve which constitutes the casing of the latch; and is contracted at its lower end to encompass snugly a cylindrical rod 20 concentric therewith. The upper end of said sleeve is provided with two spaced annular enlargements 21 which constitute the side walls of an annular groove or journal. The band-like portion of the previously mentioned yoke 16 encircles the casing 19 at this point, and fits within the groove formed between the enlargements 21, whereby said casing is prevented from moving longitudinally relative to its supporting yoke. This yoke, which may be secured to the outer sides of the hood by bolts 22, or other suitable means, is of such a shape as to hold the sleeve 19 at an oblique angle to the plane of the side of the hood, as illustrated in Fig. 1, the engagement between the yoke and sleeve being, however, sufficiently loose to permit slight play in the form of a limited pivotal movement of the latter relative to the former, for a purpose hereinafter set forth.

The stem 23 of a handle 24 enters the upper open end of sleeve 19, and snugly telescopes therein the upper end of the previously mentioned rod 20. A pin 25, or other means, passes transversely through both the stem 23 and rod 20, and thus rigidly connects these members.

A compression spring 26 is disposed within sleeve 19 about the shank of the rod 20, said spring abutting at its upper end, against the lower edge 27 of the stem 23, and at its lower end, against a small spacing collar 28 which, by maintaining that end of the spring in spaced relation to the contracted end of the sleeve 19, prevents any wedging and consequent binding of the rod 20 which might occur were the spring permitted to force itself into the tapering space present between said rod and sleeve. The spacing collar 28 would not, however, be essential in certain embodiments of the device wherein the lower end of this sleeve is differently shaped.

The lower end of the rod 20 is squared for a short distance near its extremity, and, inasmuch as the distance across the flats of the squared portion is equal to the diameter of the rod thereabove, abrupt corners 29 are formed which serve to abut against the lower end of the sleeve 19 when the rod 20 is drawn upwardly therethrough, and thus limit the upward movement of said rod relative to the sleeve.

Oppositely disposed hooks 30 project outwardly from two of the flats of the rod, and curve upwardly, the under surfaces of said hooks and the end of the rod merging into one regular curve, whereby the lower end of the rod as viewed in Fig. 1, is given a crescent-like contour. These hooks constitute the means of engagement of the rod 20 with the previously mentioned latch keeper 18, and, although only one of the hooks may function at a time, two hooks are provided on opposite sides of the rod in order that one of them will always engage with said keeper when the handle 24 of the latch is turned a quarter of a turn in either direction.

The latch keeper 18 is preferably formed of a single piece of metal, and consists of a flat portion attached to the frame of the vehicle by a machine screw 31, or other suitable means, an upwardly bent portion which extends back over part of said flat portion, and a hook-engaging portion which projects downwardly in an abrupt angle from the top of said upwardly bent portion and terminates in a horizontal edge 32 spaced from the frame structure of the vehicle. One or more slots or recesses 33 are formed in the keeper above, and parallel with, the edge 32. The upper edge 34 of the slot 33 and the edge 32 constitute engaging points of varying height for the hooks 30 of the rod 20.

More than one hook-engaging edge is provided with the keeper 18 in order to vary, if desired, the force with which the spring 26 draws the side of the hood both downwardly and inwardly. This variation in the force acting upon the hood is desirable if, in a new latch, the spring is too strong, or if, in a hood of extremely light construction the normal pull of the latch would tend to bend inwardly the side thereof. It will thus be readily understood that the tension under which the hood is fastened down may be varied by merely changing the point of engagement of the hooks with the latch keeper.

The operation of the latching device of this invention is as follows:

When the latch is fastened the handle 24 thereof assumes the position shown in Figs. 1 and 2, parallel to the side of the hood and to the longitudinal axis of the vehicle. To unfasten the latch and raise the hood the handle of the latch is turned a quarter of a revolution in either direction, no pressure downwardly thereon being necessary. When the handle is thus turned, the extreme tip of the hook 30 in engagement with either the edge 32 or 34 cams thereagainst and the rod 20 is thereby forced downwardly a very short distance until the hook rides under and is clear of the keeper. The rod is thereupon drawn upwardly into its casing by spring 26 until the corners 29 of said rod abut against the lower edge of said casing, whereupon the side of the hood may now be raised or swung outwardly by lifting on the handle of the latch.

The latch may also be unfastened in the following manner: Without turning the handle 24, a slight vertical pressure downwardly thereon will serve simultaneously to loosen the grip of the hook 30 on the keeper 18 and to swing said hook inwardly therefrom a sufficient distance to clear the keeper and permit the withdrawal upwardly of the rod into its casing. The swinging of the hook is possible because of the limited amount of pivotal movement, or play previously mentioned, that is provided for this purpose between the yoke 16 and the latch casing.

To lower the hood and fasten the latch, the handle 24, if not already in a position parallel to the side of the hood, is naturally turned parallel thereto by one when grasping the same, in the act of lowering the hood. As the hood reaches its lowest position, the curved, under surface of the adjacent hook 30 contacts with, and cams inwardly past, the top of the keeper 18, and, when pressed downwardly from above, snaps into engagement with one of the edges provided therefor in the keeper.

The latch may also be fastened by lowering the hood with the latch handle 24 still turned at right angles thereto. In this case, it is necessary that, when the hood reaches its lowest position, the handle be pressed downwardly and subsequently rotated a quarter of a turn.

Referring now to Figs. 3, 4 and 5 of the drawings, a modified form of the invention is illustrated which differs from the embodiment shown in Figs. 1 and 2, only in that a different type of supporting yoke is employed, involving a corresponding modification of the sleeve 19 where it engages therewith. The numeral 35 designates a particularly simple and inexpensive bracket yoke, preferably formed of a piece of stiff, round wire, bent into the desired shape to form a circular medial portion 36 to embrace the sleeve 19 of the latch, and two apertured end portions 37 to receive the bolts 22 which secure the yoke to the hood. In this form of the invention the annular spaced enlargements 21 on the sleeve 19 are closer together and form a groove or journal therebetween which is substantially the same shape and size as that portion of the yoke received therein.

This type of bracket yoke normally permits a greater amount of pivotal movement of the sleeve 19 therein, than does the yoke of the first embodiment.

Having reference to Figs. 6 and 7 of the drawings, an embodiment of the invention is illustrated wherein a different form of means for supporting the latch, a different latch keeper, and a differently shaped hooking means are employed.

Instead of using the form of bracket yoke previously described the sleeve 19 has affixed thereto, at its upper end, a collar 38 from one side of which an apertured ear 39 projects radially. A plate 40, which is attached to the outer side of the hood by means of bolts 41, or otherwise, is provided with a relatively large elongated aperture which coincides with the aperture 17 of the side of the hood, said plate thus serving as a reinforcing border for the aperture 17. Two spaced ears 42 project outwardly from this plate, immediately above the elongated aperture therein, and overlap both sides of the ear 39 of the collar 38. These ears are apertured in alignment with the aperture of the ear 39, and a pin 43, which passes through the three ears, serves as a pivot by which the latch is hinged to the side of the hood.

The hooks 44 of this embodiment project outwardly and upwardly from two opposite flat sides of the lower end of rod 20, and are formed with straight upper and lower edges, the lower edges of the hooks meeting at an angle below the end of the rod, as clearly illustrated in Fig. 6.

The latch keeper 45 consists of a right-angularly bent member comprising a base portion 46 and an upright portion 47 which has punched therefrom an ear 48. This ear is bent at an obtuse angle to the base portion 46, leaving a hook-engaging edge 49 on the upright portion 47 of the latch keeper. If desired a slot may be cut in this keeper, similar to, and for the same purpose as, the slot 33 of the keeper 18; in which case, of course, either the edge 49 would be formed at a lower point on the keeper or the keeper extended upwardly to provide ample space for the formation of the additional slot referred to. In this embodiment the latch engages its keeper from the outer side rather than from the inner side as in the construction illustrated in Fig. 1.

The manipulation of this form of latch, in fastening or unfastening the hood, is substantially identical with the mode of operation previously described in relation to the first embodiment.

I claim:

1. In a device of the character described, the combination with a frame portion and an engine hood movable thereto, of an axially reciprocal hood latch pivotally attached to the outside of the hood and projecting obliquely downwards through an aperture in the same into the interior thereof, an operating handle provided on the latch adjacent the exposed upper extremity of the same, and a keeper fixedly secured in the interior of the hood to said frame portion and adapted to cooperate with the lower extremity of the hood latch.

2. In a device of the character described, the combination with a frame portion and an engine hood movable relative thereto, of an axially rotatable hood latch pivotally attached to the hood and projecting obliquely through an aperture in the same into the interior thereof, and a keeper fixedly secured in the interior of the hood to said frame portion and adapted to cooperate with the lower extremity of the hood latch.

3. In a device of the character described, the combination with a frame portion and an engine hood movable relative thereto, of a hood latch pivotally attached to the hood and projecting obliquely through an aperture in the same into the interior thereof, a keeper fixedly secured within the interior of the hood to said frame portion and adapted to cooperate with the lower extremity of the hood latch, and means whereby to vary the tension under which said hood latch operates when actually functioning as such.

4. In a device of the character described, the combination with a frame portion and an engine hood movable relative thereto, of a hood latch pivotally attached to the hood and projecting obliquely through an aperture in the same into the interior thereof, and a keeper fixedly secured within the interior of the hood to said frame portion and adapted to cooperate with the lower extremity of the hood latch, said keeper providing means whereby to vary the tension under which said hood latch operates when actively functioning as such.

5. In a device of the character described, the combination with a frame portion and an engine hood movable relative thereto, of a hood latch pivotally attached to the hood and projecting obliquely through an aperture in the same into the interior thereof, and a keeper fixedly secured within the interior of the hood to said frame portion and adapted to cooperate with the lower extremity of the hood latch, said keeper provided with a plurality of horizontal latch-engaging edges whereby to vary the tension under which said hood latch operates when actively functioning as such.

6. In a device of the character described, the combination with a frame portion and an engine hood movable relative thereto, of a hood latch pivotally attached to the hood and projecting obliquely through an aperture in the same into the interior thereof, and a keeper fixedly secured within the interior of the hood to said frame portion and adapted to cooperate with the lower extremity of the hood latch, said keeper provided with a plurality of horizontal latch-engaging edges positioned at different heights above the base thereof whereby to vary the tension under which said hood latch operates when actively functioning as such.

7. In a device of the character described, the combination with a frame portion and an engine hood movable relative thereto, of a hood latch pivotally attached to the hood and projecting obliquely through an aperture in the same into the interior thereof, and a keeper fixedly secured within the interior of the hood to said frame portion and adapted to cooperate with the lower extremity of the hood latch, said hood latch being provided at its lower extremity with two oppositely disposed means for engagement with the keeper whereby such engagement may be terminated or formed upon rotation of said engaging means 90° in either direction about the axis of the latch.

8. In a device of the character described, the combination with a frame portion and an engine hood movable relative thereto, of a hood latch pivotally attached to the hood and projecting obliquely through an aperture in the same into the interior thereof, and a keeper fixedly secured within the interior of the hood to said frame portion and adapted to cooperate with the lower extremity of the hood latch, said hood latch being provided at its lower extremity with two oppositely disposed hooks for engagement with the keeper whereby such engagement may be terminated or formed upon rotation of said engaging means 90° in either direction about the axis of the latch.

9. In a device of the character described, the combination with a frame portion and an engine hood movable relative thereto, of a hood latch pivotally attached to the hood and projecting obliquely through an aperture in the same into the interior thereof, and a keeper fixedly secured within the interior of the hood to said frame portion and adapted to cooperate with the lower extremity of the hood latch, said hood latch being provided at its lower extremity with two oppositely disposed hooks projecting radially and upwardly from the longitudinal axis of the latch for engagement with the keeper whereby such engagement may be terminated or formed upon rotation of said engaging means 90° in either direction about said axis.

10. In a device of the character described, the combination with a frame portion and an engine hood movable relative thereto, of a latch casing, a yoke to connect the casing to the hood, means associated with the yoke whereby to permit a limited amount of movement between the casing and hood, a rod reciprocable within the casing and provided at its upper end with a handle and at its lower end with engaging means, means for exerting a continuous pressure on the rod to draw the same upwardly relative to the casing and a keeper fixedly secured within the interior of the hood to said frame portion and adapted to cooperate with said engaging means.

11. In a device of the character described, the combination with a frame portion and an engine hood movable relative thereto, of a latch casing, a yoke to connect the casing to the hood, means associated with the yoke whereby to permit a limited amount of movement between the casing and hood, a rod reciprocable within the casing and provided at its upper end with a handle and at its lower end with engaging means, a spring within the casing and about the rod for exerting a continuous pressure on the rod to draw the same upwardly relative to the casing and a keeper fixedly secured within the interior of the hood to said frame portion and adapted to cooperate with said engaging means.

12. In a device of the character described, the combination with a frame portion and an engine hood movable relative thereto, of a latch casing, a yoke to connect the casing to the hood, means associated with the yoke whereby to permit a limited amount of movement between the casing and hood, a rod reciprocable within the casing and provided at its upper end with a handle and at its lower end with engaging means, means for exerting a continuous pressure on the rod to draw the same upwardly relative to the casing, a keeper fixedly secured within the interior of the hood to said frame portion and adapted to cooperate with said engaging means, and means whereby to vary the tension under which said engaging means cooperates with the keeper.

13. In a device of the character described, the combination with a frame portion and an engine hood movable relative thereto, of a latch casing, a yoke to connect the casing to the hood, means associated with the yoke whereby to permit a limited amount of movement between the casing and hood, a rod reciprocable within the casing and provided at its upper end with a handle and at its lower end with engaging means, means for exerting a continuous pressure on the rod to draw the same upwardly relative to the casing, a keeper fixedly secured within the interior of the hood to said frame portion and adapted to cooperate with said engaging means, and means associated with the keeper whereby to vary the tension under which said engaging means cooperates with the keeper.

14. In a device of the character described, the combination with a frame portion and an engine hood movable relative thereto, of a hood latch including a casing and a rod reciprocable and rotatable within said casing and provided at its upper end with a handle and at its lower end with engaging means, a yoke to connect the casing to the hood whereby a limited amount of pivotal movement is permitted therebetween, and a keeper fixedly secured within the interior of the hood to the frame portion and adapted to cooperate with said engaging means of the rod.

15. In a device of the character described, the combination with a frame portion and an engine hood movable relative thereto, of a hood latch including a casing projecting obliquely through the hood, and a rod reciprocable and rotatable within said casing and provided at its upper end with a handle and at its lower end with engaging means, a yoke to connect the casing to the hood whereby a limited amount of pivotal movement is permitted therebetween, and a keeper fixedly secured within the interior of the hood to the frame portion and adapted to cooperate with said engaging means of the rod.

16. In a device of the character described, the combination with a frame portion and an engine hood movable relative thereto, of a hood latch including a tubular casing which is provided near its upper end with two spaced annular enlargements, and a rod reciprocable and rotatable within said casing and provided at its upper end with a handle and at its lower end with engaging means, a yoke attached to the hood and embracing the casing between the two spaced annular enlargements thereon whereby a limited amount of movement is permitted between the casing and hood, and means within the hood for cooperating with said engaging means of the rod.

17. In a device of the character described, the combination with a frame portion and an engine hood movable relative thereto, of a hood latch including a casing and a rod reciprocable and rotatable therein and provided at its upper end with a handle and at its lower end with a squared portion from two of the opposite flat sides of which project engaging hooks, and means within the hood for cooperating with said engaging hooks.

18. In a device of the character described, the combination with a frame portion and an engine hood movable relative thereto, of a hood latch including a casing and a rod reciprocable and rotatable therein and provided at its upper end with a handle and at its lower end with a portion substantially rectangular in cross-section from two of the opposite flat sides of which project engaging hooks, and means within the hood for cooperating with said engaging hooks.

19. In a device of the character described, the combination with a frame portion and an engine hood movable relative thereto, of a hood latch including a casing, a rod reciprocable and rotatable therein and provided at its upper end with a handle and at its lower end with a squared portion from two of the opposite flat sides of which project engaging hooks, and shoulders formed at the top of said squared portion of the rod to abut against the lower end of the casing when the rod is retracted therein, and means within the hood for cooperating with said engaging hooks.

In testimony whereof I have hereunto subscribed my name in the presence of two subscribing witnesses.

JOHN F. WHITE.

Witnesses:
RAYMOND L. GREIST,
FRANCES K. GILLESPIE.